United States Patent
Self et al.

(10) Patent No.: US 10,193,690 B1
(45) Date of Patent: Jan. 29, 2019

(54) SYSTEMS AND METHODS TO SECURE DATA USING COMPUTER SYSTEM ATTRIBUTES

(71) Applicant: U.S. Bancorp, National Association, Minneapolis, MN (US)

(72) Inventors: Blake Self, Portland, OR (US); David Lord, Portland, OR (US)

(73) Assignee: U.S. Bancorp, National Association, Minneapolis, MN (US)

( * ) Notice: Subject to any disclaimer, the term of this patent is extended or adjusted under 35 U.S.C. 154(b) by 0 days.

(21) Appl. No.: 15/720,604

(22) Filed: Sep. 29, 2017

(51) Int. Cl.
    *H04L 9/08* (2006.01)
    *H04L 9/14* (2006.01)
    *G06F 21/60* (2013.01)

(52) U.S. Cl.
    CPC .......... *H04L 9/0877* (2013.01); *G06F 21/602* (2013.01); *H04L 9/14* (2013.01); *G06F 21/60* (2013.01); *H04L 9/0861* (2013.01)

(58) Field of Classification Search
    CPC ....... H04L 9/0861; H04L 9/0877; H04L 9/14; H04L 9/08; G06F 21/60; G06F 21/602
    See application file for complete search history.

(56) References Cited

U.S. PATENT DOCUMENTS

| | | | | |
|---|---|---|---|---|
| 6,249,866 B1 * | 6/2001 | Brundrett | ............ | G06F 12/1408 380/286 |
| 6,981,141 B1 * | 12/2005 | Mahne | ............ | G06F 21/80 713/165 |
| 9,292,699 B1 * | 3/2016 | Stuntebeck | ............ | G06F 21/602 |
| 9,367,701 B2 | 6/2016 | Merchan et al. | | |
| 9,864,874 B1 * | 1/2018 | Shanbhag | ............ | G06F 21/6218 |
| 2009/0164788 A1 * | 6/2009 | Cho | ............ | H04L 63/061 713/175 |
| 2010/0257372 A1 * | 10/2010 | Seifert | ............ | G06F 21/602 713/189 |
| 2013/0028415 A1 * | 1/2013 | Takashima | ............ | H04L 9/0847 380/44 |
| 2013/0085944 A1 * | 4/2013 | Fielder | ............ | G06Q 20/206 705/67 |
| 2013/0114810 A1 * | 5/2013 | Kobayashi | ............ | H04L 9/0836 380/47 |
| 2013/0198521 A1 * | 8/2013 | Wu | ............ | G06F 21/6209 713/175 |

(Continued)

OTHER PUBLICATIONS

"Algorithm for unique KEY generation," Stack Overflow (Jun. 2011), accessed on Apr. 19, 2017 at https://stackoverflow.com/questions/6455040/algorithm-for-unique-key-generation.

(Continued)

*Primary Examiner* — Jayesh M Jhaveri
(74) *Attorney, Agent, or Firm* — Foley & Lardner LLP

(57) ABSTRACT

Systems and methods of the present disclosure are directed to a computing system configured to provide seamless protection to data (which can include, without limitation, data files, executable files, system configuration files, program files, and other data) stored in the computing system, while making it nearly impossible for attackers to be able to access the data outside of the computing system. The computing system uses targeted encryption and decryption, in which values of one or more system attribute are used to generate a cryptographic key used for encryption and decryption of data stored in the computing system.

20 Claims, 9 Drawing Sheets

(56) References Cited

U.S. PATENT DOCUMENTS

| | | | |
|---|---|---|---|
| 2014/0164776 A1* | 6/2014 | Hook | H04L 9/14 |
| | | | 713/171 |
| 2014/0281514 A1* | 9/2014 | Erofeev | G06F 21/6218 |
| | | | 713/165 |
| 2014/0359309 A1* | 12/2014 | Cachin | H04L 9/0822 |
| | | | 713/189 |
| 2015/0237018 A1 | 8/2015 | Parry et al. | |
| 2015/0310219 A1* | 10/2015 | Haager | G06F 21/602 |
| | | | 713/165 |
| 2016/0150403 A1* | 5/2016 | Puri | H04W 12/04 |
| | | | 380/270 |
| 2016/0196435 A1* | 7/2016 | Oh | H04W 4/21 |
| | | | 713/193 |
| 2016/0277194 A1* | 9/2016 | Sun | H04L 9/3247 |
| 2017/0235963 A1* | 8/2017 | Ahn | G06F 21/602 |
| | | | 713/190 |
| 2017/0250811 A1* | 8/2017 | Edwards | H04L 9/083 |

OTHER PUBLICATIONS

Hubis, Walt, "An Introduction to Key Management for Secure Storage," LSI Corporation (2008), accessed on Apr. 19, 2017 at https://www.snia.org/sites/default/files/Hubis-W_Introduction_to_Key_Management.pdf.

Jayakumar, M. et al., "Symmetric Algorithms Key Generate Using Static Ip Address," IJARCSSE, vol. 2, Issue 7 (Jul. 2012) pp. 55-58.

* cited by examiner

SYSTEMS AND METHODS TO SECURE DATA USING COMPUTER SYSTEM ATTRIBUTES

FIELD OF THE DISCLOSURE

The present disclosure is generally directed to computer systems. In particular, the present disclosure describes techniques for encrypting data using computer and network information.

BACKGROUND OF THE DISCLOSURE

One approach to securing data is to encrypt the data using an encryption key. The data, once encrypted with the encryption key, can be decrypted using the same or a corresponding encryption key. Some cryptographic techniques rely on the user to possess the cryptographic key. In some other techniques, the encryption key may be embedded in the encrypted data, such that the user can use the embedded encryption key to decrypt the encrypted data.

BRIEF SUMMARY OF THE DISCLOSURE

Targeted encryption is an encryption technique that creates a key based on known system values, as opposed to giving a key to a user or embedding the key into the encrypted binary. Using this technique, digital assets can be seamlessly protected with less risk than traditional encryption since the key is not embedded or in the user's possession.

In one example implementation, a Word Document with a macro or modification for encryption and decryption can be protected using targeted encryption. The encryption key can be based on intranet values such as a file on the network or even network values given by a dynamic host configuration protocol (DHCP) server. These values can be transformed with a hashing function to better protect the secrecy of the key. Since this is all seamless, the user would not know what they needed to steal with the files if they were an insider threat. For an outsider threat, the attacker would not know that the files were encrypted until they inspected them off the host network. If the only security needed was the prevention of the file leaving the machine, the decryption key can be derived from something such as the main hard drive universally unique identifier (UUID). Any attacker trying to brute-force the key would be stuck with the same scenario as trying to brute-force encryption without the key.

In another example implementation, a binary for a Society for Worldwide Interbank Financial Telecommunication (SWIFT) transactions can be protected using targeted encryption. In an example attack on a SWIFT transaction, an attacker can modify a SWIFT binary and associated .dll files, on which the SWIFT transaction is executed, in order to manipulate a system to do massive money transfers. The SWIFT binary can use targeted encryption based on intranet files or system files as discussed above. When an attacker steals the binaries in order to reverse engineer and modify them, the attacker will be unable to as the binary will be encrypted and the attacker will not have the key. The attacker would not only have to figure out how the key was derived, but they would also have to get back on the system to access the key. If the attacker were able to get the key, the attacker would have to reproduce the targeted encryption system to decrypt, modify, and then re-encrypt the binary.

In another example implementation, security-monitoring applications can be protected using targeted encryption. Historically, attackers have been able to modify binaries of security monitoring applications to ignore certain files or certain file changes. They've been able to do this, because they can easily reverse engineer the security software binaries and modify them. Targeted encryption can be used to secure the monitoring applications from tampering. This will lead to our security applications being far more reliable than they have been in the past.

The encryption can include gathering system and intranet information, transforming the gathered values using, for example, hashing functions, using the transformed values as a key to encrypt data, surround the encrypted data with a decryption code, without including the key. The decryption can include running the decryption code surrounding the encrypted data. The decryption can further include gathering system and intranet information, transforming the gathered values using, for example, hashing functions, and using the transformed values to decrypt the encrypted data. The encrypted data may be decrypted into memory only, leaving the data encrypted on the disc.

In one aspect, a method for securing data in a computing system includes receiving, at the computing system, data for storage to a data storage device. The method further includes acquiring values of one or more system attributes from a plurality of system attributes associated with the computing system based on a key generation policy. The method also includes transforming the values of the one or more system attributes using a transformation function based on the key generation policy to generate a cryptographic key. The method additionally includes encrypting the received data using the generated cryptographic key to generate encrypted data.

In some embodiments, acquiring values of one or more system attributes from a plurality of system attributes associated with the computing system based on a key generation policy includes acquiring values of at least one of a file system attribute and a hardware attribute associated with the computing system. In some embodiments, the file system attribute includes data including but not limited to a file name, a directory name, a partition name, data within a file, and metadata. In some embodiments, the hardware attribute includes at least one of a media access control (MAC) address, a universally unique identifier (UUID), and an international mobile equipment identity (IMEI). In some embodiments, the key generation policy defines a number and type of system attributes to be acquired to be used for generating the cryptographic key. In some embodiments, the key generation policy defines a type of transformation function used for generating the cryptographic key. In some embodiments, the method further includes storing, in a list, the acquired values of the one or more system attributes, the key generation policy, and an identity of the corresponding received data that has been encrypted.

In some embodiments, the method further includes receiving a request to decrypt the generated encrypted data. The method further includes accessing the list to determine the acquired values of the one or more system attributes and the key generation policy corresponding to the identity of the received data that has been encrypted. The method also includes re-generating the cryptographic key using the determined values of the one or more system attributes and the key generation policy. The method additionally includes using the generated cryptographic key to decrypt the encrypted data. In some embodiments, the method also includes adding a decryption code to the encrypted data, where the decryption code, when used with the generated cryptographic key, is capable of generating the received data from the encrypted data.

In one aspect, a computing system includes a key generator, an encryption module, and a decryption module. The key generator is configured to acquire values of one or more system attributes from a plurality of system attributes associated with the computing system based on a key generation policy, and transform the values of the one or more system attributes using a transformation function based on the key generation policy to generate a cryptographic key. The encryption module is configured to to receive a request for encrypting data for storage in a data storage device, receive the cryptographic key from the key generator, and to use the received cryptographic key to encrypt the received data to generate encrypted data. The decryption module is configured to receive a request for decrypting the encrypted data and to decrypt the encrypted data using the cryptographic key.

In some embodiments, the values of one or more system attributes includes values of at least one of a file system attribute and a hardware attribute associated with the computing system. In some embodiments, the file system attribute includes at least one of a file name, a directory name, a partition name, and metadata. In some embodiments, the hardware attribute includes at least one of a media access control (MAC) address, a universally unique identifier (UUID), and an international mobile equipment identity (IMEI). In some embodiments, the key generation policy defines a number and type of system attributes to be acquired to be used for generating the cryptographic key. In some embodiments, the key generation policy defines a type of transformation function used for generating the cryptographic key. In some embodiments, the key generator is further configured to store, in a list, the acquired values of the one or more system attributes, the key generation policy, and an identity of the corresponding received data.

In some embodiments, the key generation module is further configured to access the list to determine the acquired values of the one or more system attributes and the key generation policy corresponding to the identity of the received data that has been encrypted. The key generation module is further configured to re-generate the cryptographic key using the determined values of the one or more system attributes and the key generation policy. The key generation module is also configured to provide the re-generated cryptographic key to the decrypting module. In some embodiments, the encryption module is further configured to add a decryption code to the encrypted data, and where the decryption code, when used with the generated cryptographic key, is capable of generating the received data from the encrypted data; and where the decryption module is further configured to use the added decryption code to decrypt the encrypted data.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

Figure 1A:
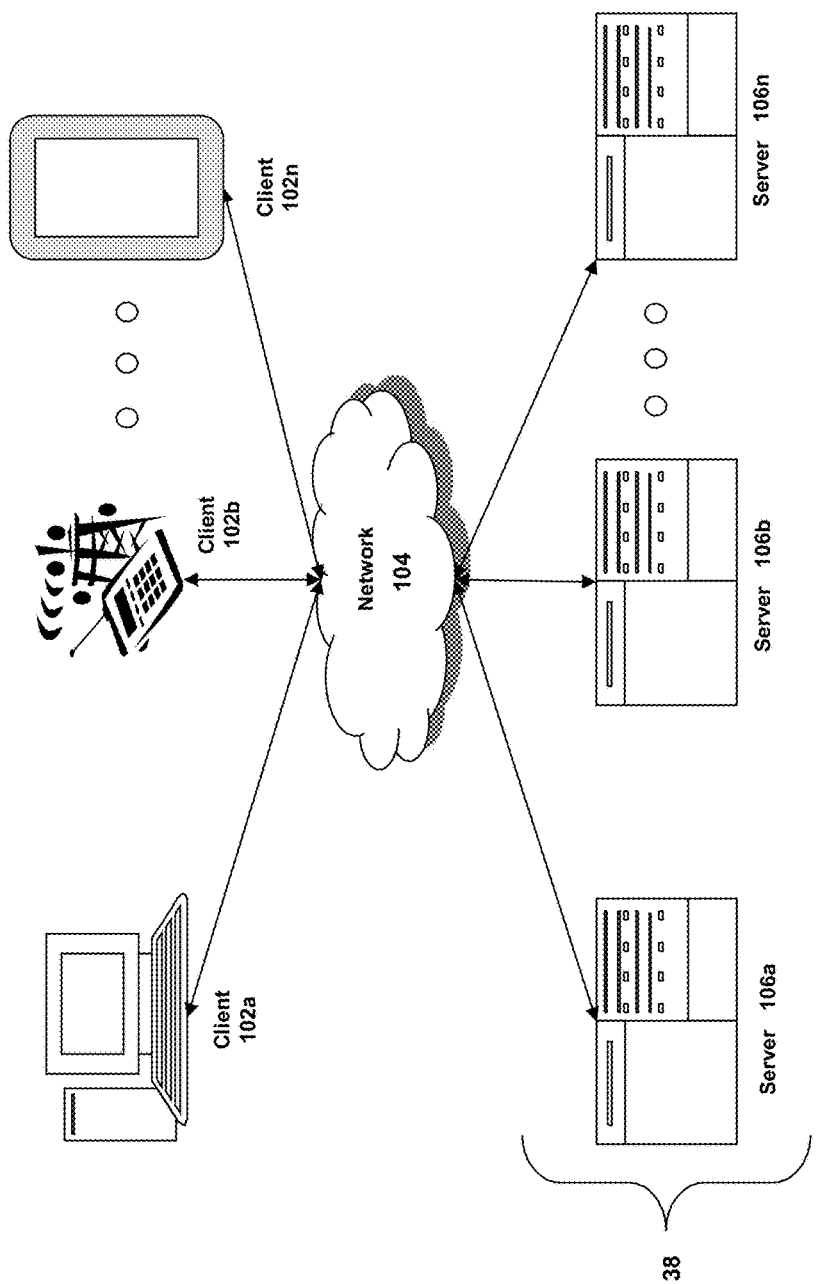
FIG. 1A is a block diagram depicting an embodiment of a network environment comprising a client device in communication with server device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

DETAILED DESCRIPTION

For purposes of reading the description of the various embodiments below, the following descriptions of the sections of the specification and their respective contents may be helpful:

Section A describes a network environment and computing environment, which may be useful for practicing embodiments described herein.

Section B describes embodiments of systems and methods for a computing system using targeted encryption and decryption.

A. Computing and Network Environment

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
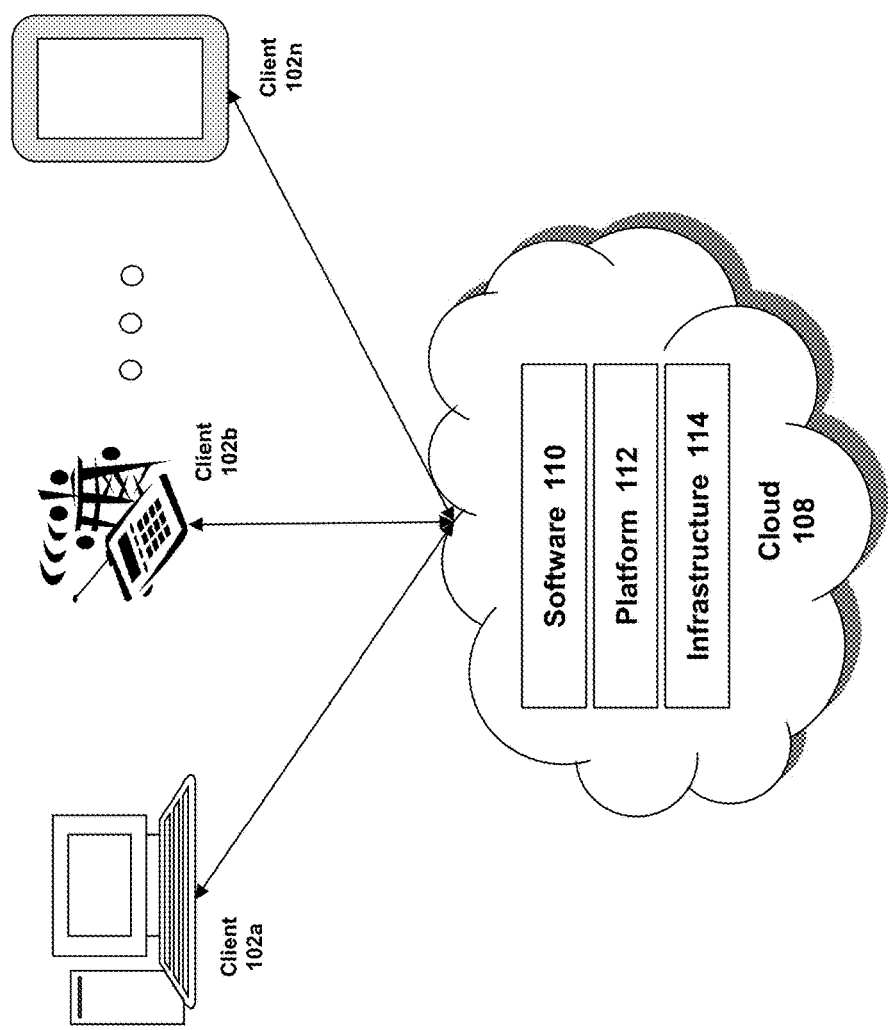
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS can include infrastructure and services (e.g., EG-32) provided by OVH HOSTING of Montreal, Quebec, Canada, AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
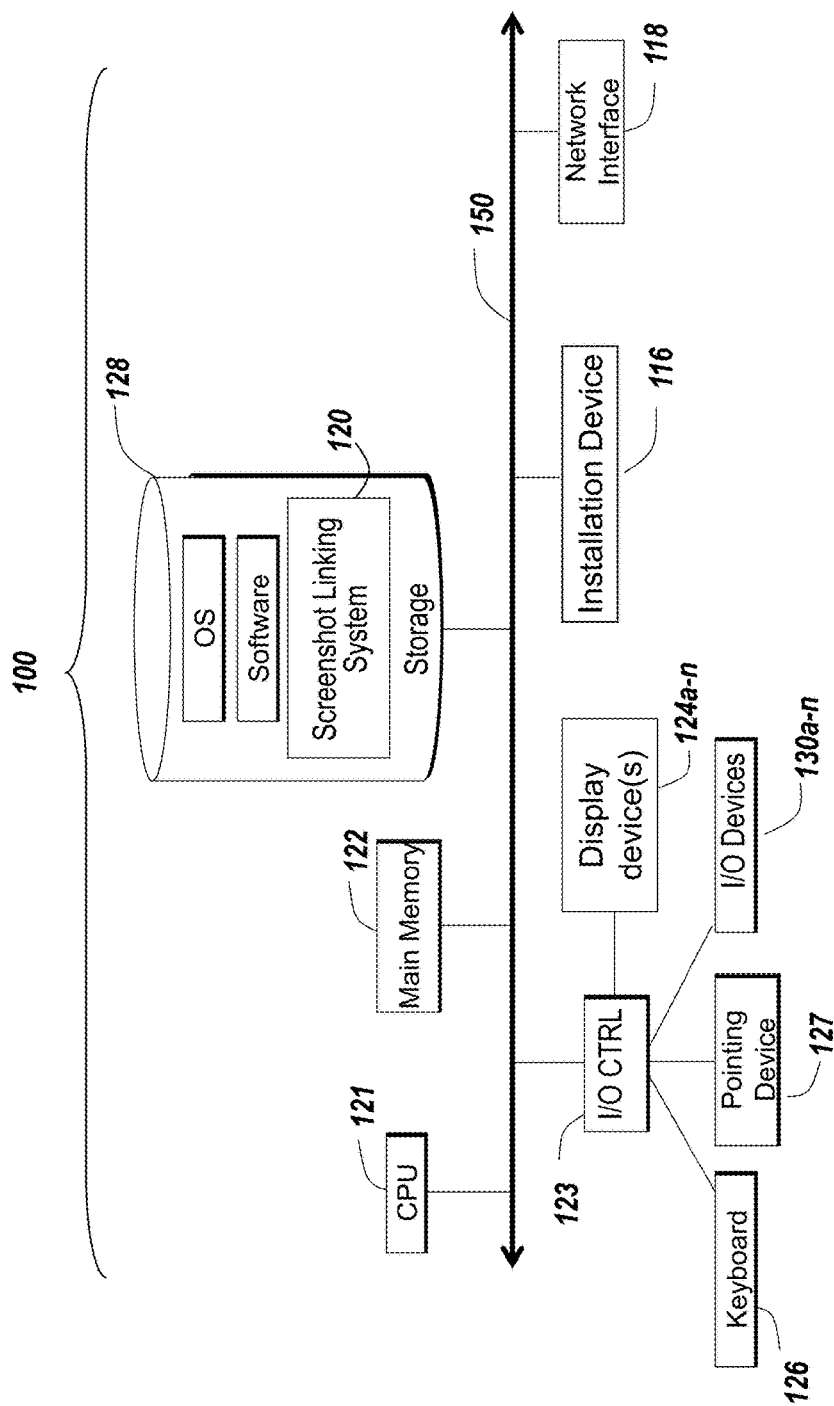
FIGS. 1C and 1D are block diagrams depicting embodiments of computing devices useful in connection with the methods and systems described herein.
Figure 1D:
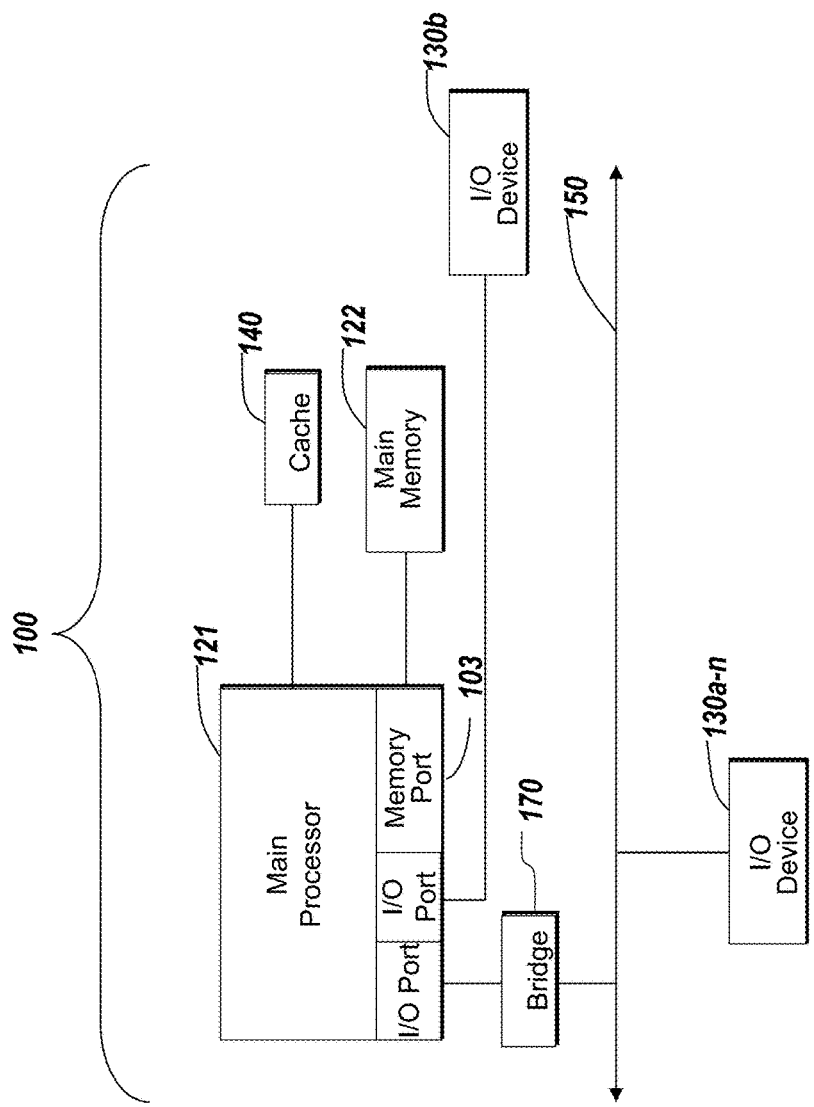

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of a screenshot linking system 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAIVI), Silicon-Oxide-Nitride-Oxide-Silicon (SO-NOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touch-screen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touch-screen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software for the screenshot linking system 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage devices 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Targeted Encryption

Figure 2:
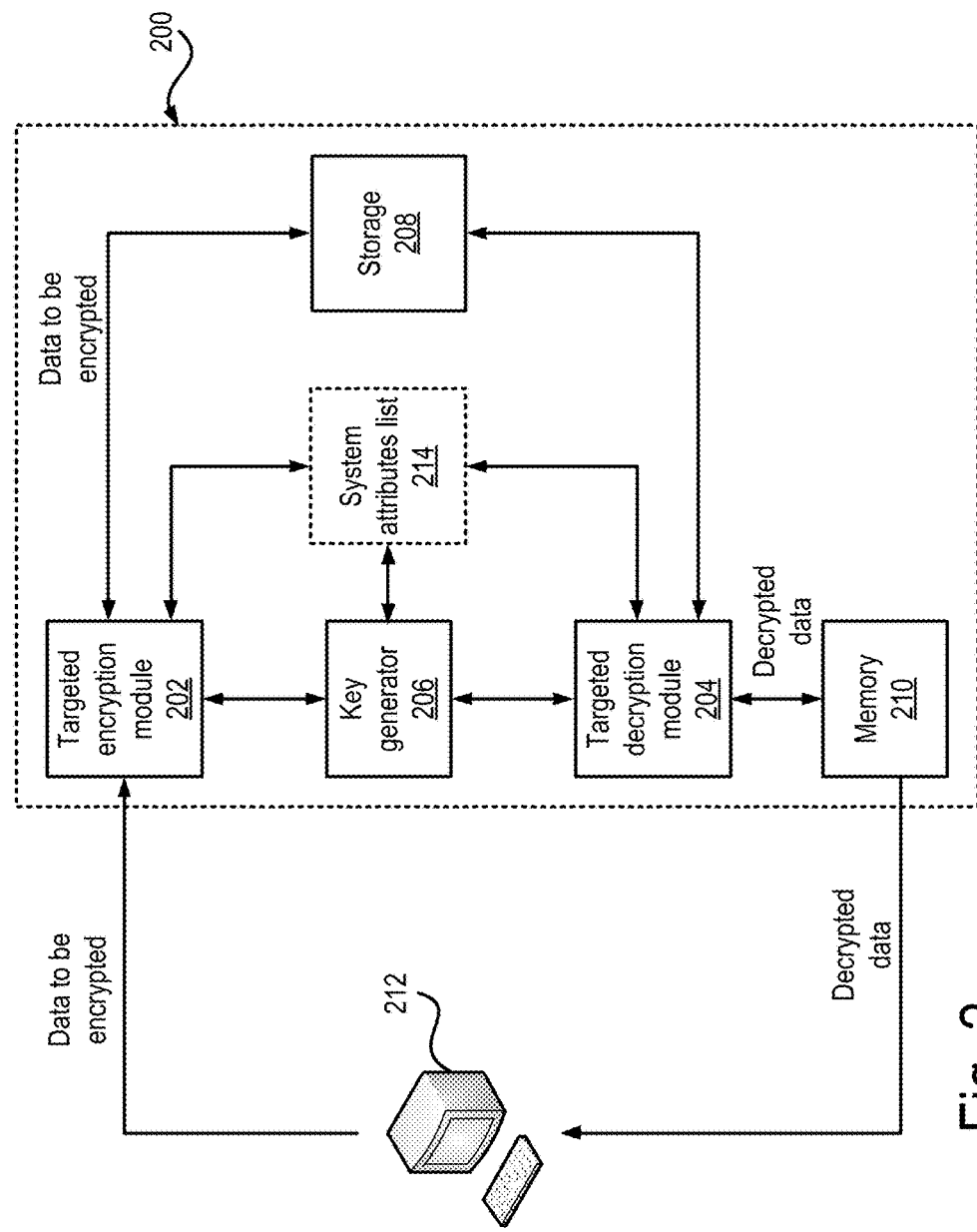
FIG. 2 illustrates a representation of an example computing system.

FIG. 2 illustrates a representation of an example computing system 200. The computing system 200 includes an encryption module 202, a decryption module 204, a key generator 206, storage 208, memory 210, a user terminal 212, and optionally a system attributes list or database 214. The computing system 200 can encrypt a variety of data, examples of which can include, without limitation, data files, executable files, system configuration files, program files, and the like. The computing system 200 also can decrypt the encrypted files. In one example implementation, the computing system 200 can encrypt data received from a user terminal 212 and store the encrypted data in the storage 208. The computing system 200, responsive to a request to access the data, can decrypt the encrypted data, and provide the decrypted data. In another example implementation, the computing system 200 can encrypt a portion, or entirety of, the data stored in the storage 208. Upon request from the user terminal 212 for data stored on the storage, the computing system 200 can decrypt the encrypted data and provide the decrypted data.

The computing system 200 can be implemented using one or more computing environments discussed above in relation to FIGS. 1A-1D. For example, the computing system 200 can be implemented as a client 102a-102n, as a server 106a-106n, or as a cloud 108. The computing system 200 can communicate with the user terminals 212 directly, over a local area network, or a wide area network. In one or more implementations, the computing system 200 can include the network, and where one or more components of the computing system 200 can communicate over the network. In one or more implementations, as mentioned above, the computing system 200 can provide users at the user terminal 212 secure access to the data stored in the storage 208. However, the computing system 200 can provide secure access to the data on the storage 208 also to other servers and computing systems that are communicably coupled to the computing system 200.

As discussed in detail further below, the computing system 200 can provide seamless protection of data stored and accessed at the computing system 200, while making it nearly impossible for attackers to be able to access the data outside of the computing system 200. The computing system uses targeted encryption and decryption based on values of one or more system attributes of the computing system 200 to generate a cryptographic key used for encryption and decryption of data stored in the computing system 200. As the attacker do not have the knowledge of or access to the system attributes used to generate the cryptographic key, the attacker would have to resort to brute-force cryptanalysis to guess the cryptographic key.

The targeted encryption module 202 can encrypt data based on one or more encryption algorithms. For example, the targeted encryption module 202 can use symmetric key encryption algorithms such as, for example, the Advanced Encryption Standard (AES), data encryption standard (DES), 3DES, Twofish, and the like. In symmetric key cryptography, both encryption and decryption is carried out using the same key. The targeted decryption module 204 can use decryption algorithms that correspond to the encryption algorithms used by the targeted encryption module 202. For example, the targeted decryption module 204 can use a symmetric key decryption algorithm that corresponds to the symmetric key algorithm used by the targeted encryption module 202. Both the targeted encryption module 202 and the targeted decryption module 204 can use the same key. In this manner, given the correct key, data that has been encrypted by the targeted encryption module 202 can be successfully decrypted by the targeted decryption module 204.

The key generator 206 can provide a key, or data that can be used to generate the key, which is used by the targeted encryption module 202 and the targeted decryption module 204. The key generator 206 can provide the key based on the values of one or more system attributes associated with the computing system 200. These system attributes can include file system attributes, network attributes, hardware attributes, system software attributes, user attributes (e.g. biometric data), and environmental attributes associated with the computing system 200. In addition, as the key generator 206 generates the key from system attributes of the computing system 200 itself, the key generator 206 does not need to employ a key exchange process to exchange the encryption and decryption keys.

Figure 3:
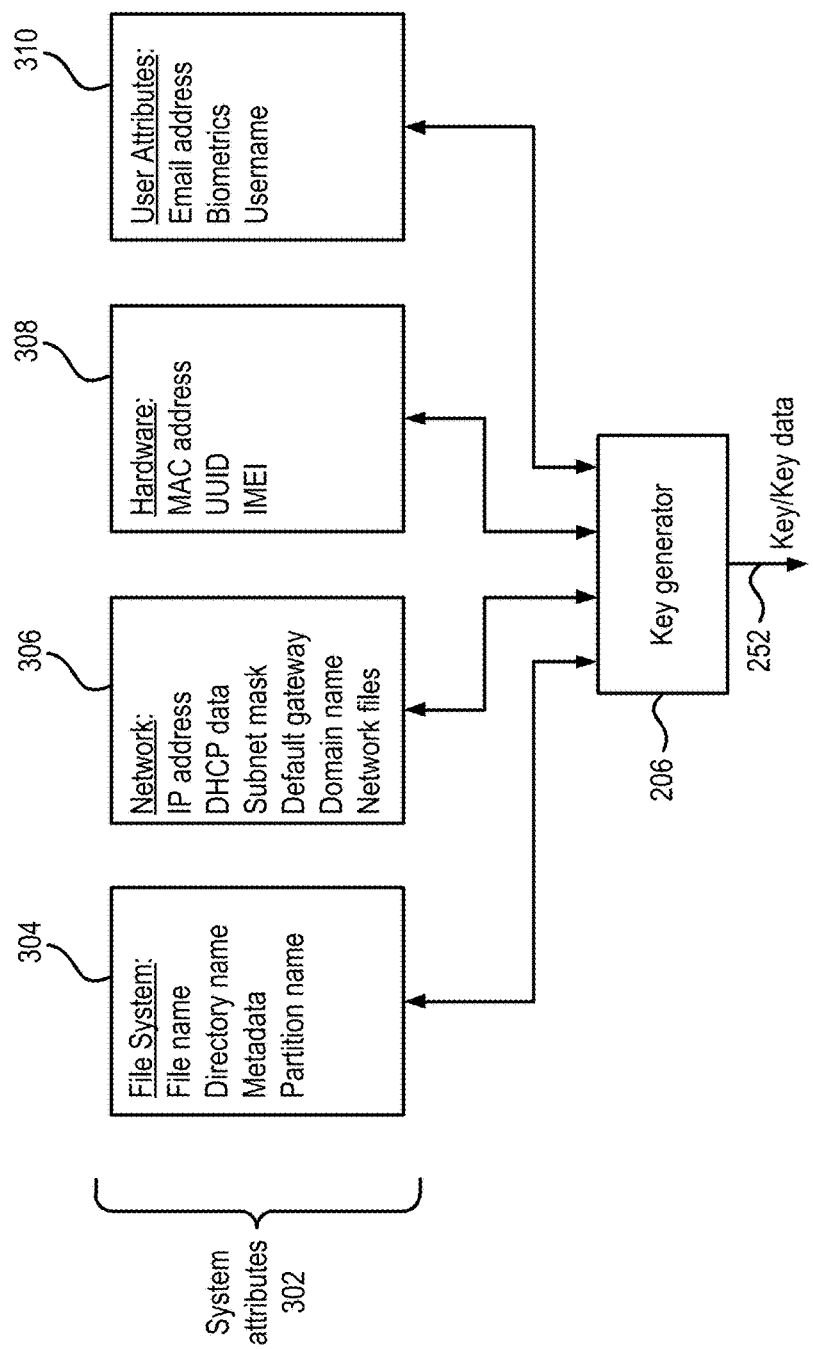
FIG. 3 illustrates a representation of the key generator shown in FIG. 2.

FIG. 3 illustrates a representation of the key generator 206 shown in FIG. 2. In particular, FIG. 3 illustrates the various system attributes 302 that the key generator 206 can use to generate a key or key data 252. The system attributes 302 can include file system attributes 304, network attributes 306, and hardware attributes 308 and user attributes 310. The list of system attributes is not limited to the ones shown in FIG. 3, and that other system attributes also can be used to by the key generator 206 to generate the key or key data 252. The key generator 206 can communicate with the file system of the computing system 200 to acquire the values of the file system attributes 302. The file system can operate on data stored on the storage 208 or on a networked storage device. Example file systems can include, without limitation, macOS, UNIX, ext, XFS, Solaris, BSD, OS/2, FAT, NTFS, exFAT, Live File System, ReFS, and the like. The file system can include an application program interface (API) that allows the key generator 206 to interact with the file system. In particular, the key generator 206 can send commands to the API to request for values of file system attributes, and in response, the API can return the requested values. For example, the key generator 206 can send one or more commands to the file system API to provide the contents of a directory structure maintained by the file system, or the partitions maintained by the file system. The key generator 206 also can send commands to the API to provide the key generator 206 with names of one or more directories maintained by the file systems. The key generator 206 also can request the file system API to provide metadata associated with one or more files. Metadata can include information about the associated file. The information can include, for example, author name, date created, date modified, file size, etc.

The key generator 206 also can communicate with a network controller to acquire values for one or more network attributes 306. For example, the key generator 206 can communicate with a dynamic host configuration protocol (DHCP) server to acquire values of network attributes associated with the computing system 200. The DHCP server can be capable of distributing network configuration parameters, such as IP addresses, to the computing system 200. The key generator 206 can communicate with the DHCP server to determine the IP address of the computing system 200. The key generator 206 also can receive additional network information associated with the network, such as, for example, the default gateway, domain name, name servers, time servers, and subnet mask.

The key generator 206 also can communicate with one or more hardware controllers to acquire values of one or more hardware attributes 308 associated with the computing system 200. For example, the key generator 206 can communicate with a hardware controller of a network interface card that connects the computing system to the network to acquire values of one or more hardware attributes, such as, the media access control (MAC) address of the network interface card. The MAC address of the network interface card can uniquely identify the network interface card. The key generator 206 also can communicate with one or more hardware controllers to determine the value of a universally unique identifier (UUID) assigned to the hardware device. In instances where the computing system includes a mobile communication device, the key generator 206 also can request a hardware controller to provide the value of the international mobile equipment identity (IMEI) associated with the mobile communication device.

The key generator 206 also can communicate with an operating system or the file system to acquire values of one or more user attributes 310 associated with the computing system 200. For example, the key generator 206 can communicate with the operating system to access one or more usernames or email addresses associated with users that can access the computing system 200. The usernames or email addresses may also be accessed from a file in the file system that stores one or more usernames. The key generator 206 may also communicate with a security module of the computing system 200 to acquire biometric data associated with one or more users. The biometric data may be associated with physiological characteristics of users, and can include data related to fingerprints, palm-prints, facial characteristics, iris or retinal characteristics, DNA, and other physiological characteristics.

In one or more example implementations, the key generator 206 can acquire the values of one or more attributes discussed above from an operating system running on the computing system 206. The operating system can maintain the values of one or more attributes discussed above in configuration files. The key generator 206 can request the values of these attributes from the operating system in addition to, or instead of, requesting them from the file system, the network controller, or the hardware controllers.

As mentioned above, the key generator 206 can use values of one or more attributes to generate a cryptographic key. The number and type or attributes used to generate the cryptographic key can be based on a key generation policy. For example, The key generation policy can specify the particular attributes to be used to generate the cryptographic key. For example, the key generation policy can specify using a combination of the values of three file system attributes 304. In another example, the key generation policy can specify using values of one attribute selected from each of the file system attributes 304, the network attributes 306, and the hardware attributes 308. The key generator 206 can request the values of each of the attributes specified by the key generation policy, and generate the cryptographic key based on those values.

In one or more implementations, the key generator 206 can combine the values of the specified attributes and use the combined values as a cryptographic key. The key generation policy also can specify the order in which the values of the attributes are to be combined to generate the cryptographic key.

In one or more implementations, the key generation policy also can specify a transformation function for transforming the values of the attributes into a cryptographic key. For example, a transformation function can include a hash function, which maps data of arbitrary size to data of fixed size. Values of the attributes specified by the key generation policy can have variable lengths, while most cryptographic encryption and decryption algorithms rely on fixed length keys. Therefore, a transformation function, such as a hash function can be useful in transforming the variable length attribute values into a fixed length cryptographic key. In one or more example implementations, the transformation function can use cryptographic hash functions, such as, MD4, MD5, SHA-1, SHA-2, SHA-3, and the like. For example, the cryptographic key can be generated using the function: SHA-3(attribute value). In instances where values of more than one attribute is used, the cryptographic key can be generated using the function: SHA-3(attribute 1)+SHA-3 (attribute 2)+SHA-3(attribute 3), where the "+" operator can include an binary add operator. Although an "XOR" operator, or other binary operators, can be used instead as well. Of course, the hash function SHA-3 used above is only an example, and that other has functions in place of and in combination with SHA-3 can also be used.

Referring again to FIG. 2, the key generator 206, can provide the generated key to the targeted encryption module 202 and the targeted decryption module 204, shown in FIG. 2. The targeted encryption module 202 uses the key 202 to encrypt data while the targeted decryption module 204 uses the key to decrypt previously encrypted data using the same key.

Figure 4:
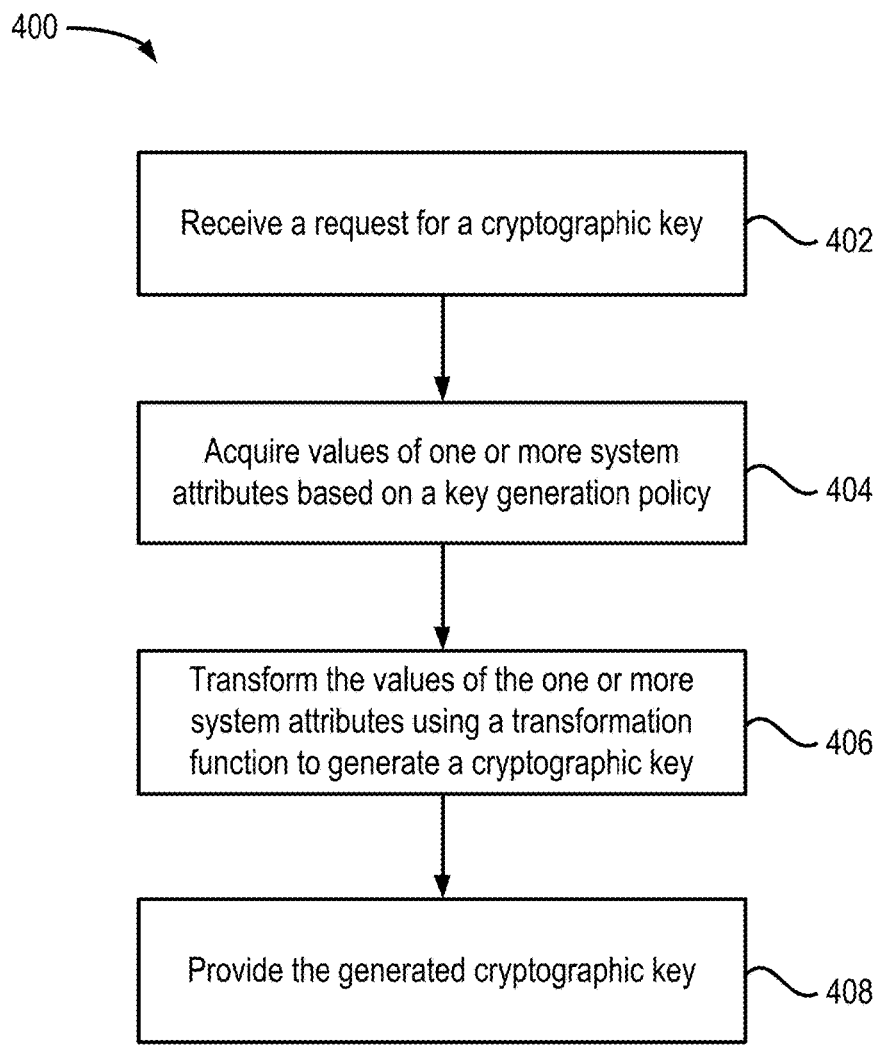
FIG. 4 depicts a flow diagram of an example key generation process.

FIG. 4 depicts a flow diagram of an example key generation process 400. The key generation process 400 can be executed, for example, by the key generator 206 shown in FIGS. 2 and 3 to generate cryptographic keys based on system attributes of the computing system 200. The process 400 includes receiving a request for a cryptographic key (stage 402). The process 400 further includes acquiring values of one or more system attributes based on a key generation policy (stage 404). The process 400 also includes transforming the values of one or more system attributes using a transformation function to generate the cryptographic key (stage 406). The process 400 additionally includes providing the generated cryptographic key to the requester (stage 408).

The process 400 includes receiving a request for a cryptographic key (stage 402). As discussed above, the key generator 206 can receive requests to provide a cryptographic key from the targeted encryption module 202 and the targeted decryption module 204. The process 400 further includes acquiring values of one or more system attributes based on a key generation policy (stage 404). As discussed above in relation to FIGS. 2 and 3, the key generator 206 can acquire values of various system attributes of the computing system 200. The attributes can include, for example, file system attributes 304, network attributes 306, and hardware attributes 308. The key generator 206 can interface with APIs, network servers, hardware controllers, and operating systems associated with the computing system 200 to acquire the values of various system attributes. Further, the key generator 206 can acquire values of those attributes specified by the key generation policy. The key generation policy can specify the number and type of system attributes to use to generate the cryptographic key.

The process also includes transforming the values of one or more system attributes using a transformation function to generate the cryptographic key (stage 406). As discussed above, the key generator 206 can use one or more mathematical transformation functions to transform the values of the attributes acquired by the key generator 206 into a cryptographic key. The transformation functions can include, for example, hash functions that can transform variable length values into fixed length bit strings that can be used as cryptographic keys. The process 400 further includes providing the generated cryptographic key to the requester (stage 408). As discussed above, the key generator 206 can provide the generated cryptographic key to the targeted encryption module 202 and to the targeted decryption module 204.

Figure 5:
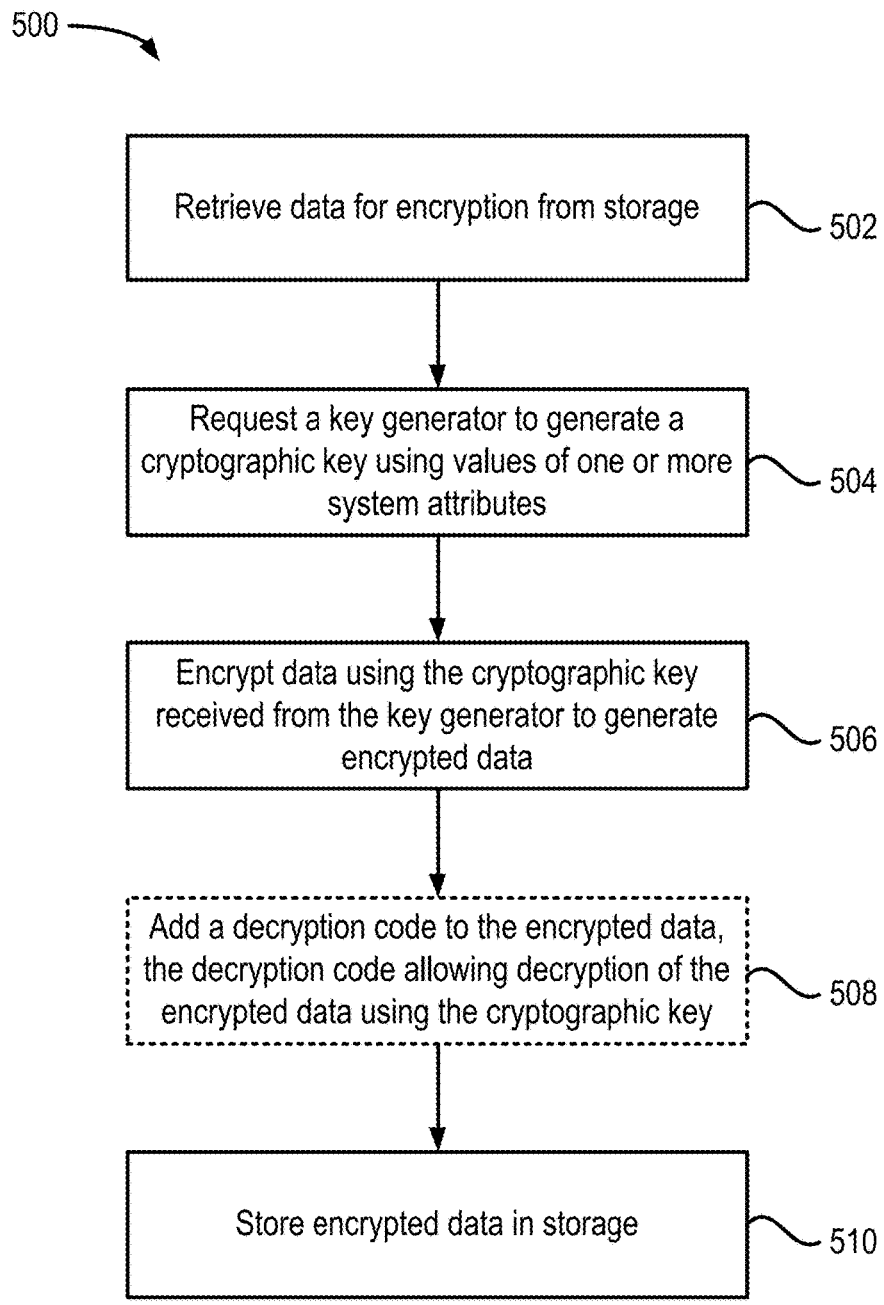
FIG. 5 depicts a flow diagram of an example targeted encryption process.

While the key generator 206 has been shown as a separate module in the computing system 200, it is understood that the key generator 206 can included in one or both of the targeted encryption module 202 and the targeted decryption module 204. In one or more implementations, the key generation policy, based on which the system attributes are selected can be the same for the FIG. 5 depicts a flow diagram of an example targeted encryption process 500. In particular, the process 500 can be executed by the targeted encryption module 202 shown in FIG. 2 to generate encrypted data based on the cryptographic key provided by the key generator 206. The process includes retrieving data for encryption from storage (stage 502). The process 500 also includes requesting a key generator to generate a cryptographic key using values of one or more system attributes (stage 504). The process 500 further includes encrypting data using the cryptographic key received from the key generator to generate encrypted data (stage 506). The process 500 additionally includes storing the encrypted data in storage (stage 510). The process 500 may also include adding a decryption code in the encrypted data, where the decryption code allows the decryption of the encrypted data using the cryptographic key (stage 508).

The process 500 includes retrieving data for encryption form storage (stage 502). As discussed above in relation to FIG. 2, the targeted encryption module 202 can retrieve data that is to be encrypted from the storage 208. In one or more implementations, the targeted encryption module 202 can instead encrypt data received from the terminal 218 prior to storing the data in storage 208. The targeted encryption module 202 may also receive data to be encrypted from an application running on the computing system 200. In any case, the targeted encryption module 202 can load the data to be encrypted in memory 210 for subsequent encryption. The process 500 further includes requesting a key generator to generate a cryptographic key based on values of one or more system attributes (stage 504). The targeted encryption module 202 can request the key generator 206 to generate a cryptographic key. As discussed above in relation to FIGS. 2-4, the key generator 206 can generate a cryptographic key based on values of one or more system attributes. The cryptographic key generated by the key generator 206 can be received by the targeted encryption module 202. The process 500 also includes encrypting data using the cryptographic key received from the key generator to generate encrypted data (stage 506). As discussed above, the targeted encryption module 202 can use a variety of encryption algorithms to encrypt the data. For example, the targeted encryption module 202 can use symmetric key encryption algorithms to encrypt the data. In some implementations, the targeted encryption module 202 may also use asymmetric or public key cryptographic algorithms to encrypt the data, however, in instances where encryption and decryption time is a factor, the targeted encryption module 202 may use symmetric key encryption algorithms, which are faster to execute than asymmetric key encryption algorithms. The targeted encryption module 202 can generate encrypted data based on the encryption of the data using the cryptographic key received from the key generator 206.

The process 500 additionally includes storing the encrypted data in storage (stage 510). As discussed above, the targeted encryption module 202 can store the encrypted data in storage 208. As the data stored is encrypted, any unauthorized access to the storage 208 would result in the attacker retrieving the encrypted data, and not the plaintext data. Because the attacker does not have the cryptographic key, or the knowledge of how the cryptographic key has been generated, the attacker would have to resort to brute-force cryptanalysis to decrypt the encrypt the data, which can be extremely difficult, if not impractical.

The process 500 may also include adding a decryption code to the encrypted data, where the decryption code allows the decryption of the encrypted data using the cryptographic key (stage 508). In some implementations, the targeted decryption module 204 is configured to use a decryption algorithm that corresponds to the encryption algorithm used by the targeted encryption module 202. However, in some implementations, it may be beneficial to include the code of the decryption algorithm along with the encrypted data, such that the targeted decryption module 204 can readily have access to the decryption algorithm to be used to decrypt the encrypted data when the targeted decryption module 204 accesses the encrypted data. For example, if the targeted encryption module 202 uses a proprietary encryption algorithm, which is not likely to be readily available to the targeted decryption module 204 at the time of decryption, the inclusion of the decryption algorithm simplifies the process of accessing the proprietary decryption algorithm. In some implementations, the decryption algorithm or code can be included in a same file that includes the encrypted data. The decryption algorithm or code can be appended at the beginning, at the end, or at a pre-determined location within the file that includes the encrypted data. In some implementations, the file including the encrypted data can include an identity of the decryption algorithm instead of the decryption algorithm or code itself, where the identity of the encryption or decryption algorithm can be used by the decryption module 204 to determine the decryption code to be used to decrypt the encrypted data.

Figure 6:
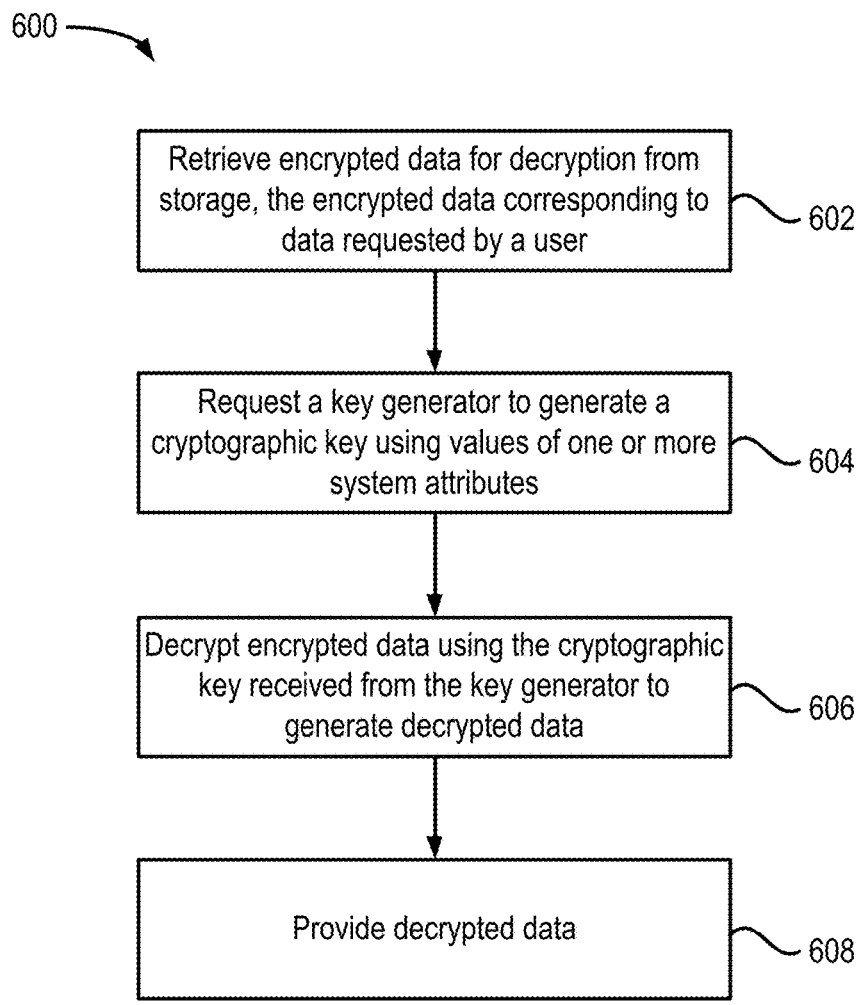
FIG. 6 depicts a flow diagram an example targeted decryption process.

FIG. 6 depicts a flow diagram an example targeted decryption process 600. In particular, the process 600 can be executed by the targeted decryption module 204 shown in FIG. 2 to generate decrypted data based on the cryptographic key provided by the key generator 206. The process 600 includes retrieving encrypted data for decryption from the storage, where the encrypted data corresponds to the data requested by the user (stage 602). The process 600 further includes requesting the key generator to generate a cryptographic key using values of one or more system attributes (stage 604). The process also includes decrypting encrypted data using the cryptographic key received from the key generator to generate decrypted data (stage 606). The process 600 additionally includes providing the decrypted data (stage 608).

The process 600 includes retrieving encrypted data for decryption from the storage, where the encrypted data corresponds to the data requested by the user (stage 602). In one or more implementations, the targeted decryption module 204 can retrieve encrypted data from the storage 208 responsive to a request for accessing plaintext data corresponding to the encrypted data. For example, the computing system 200 may receive a request from the user terminal 212 to access a data file stored in the storage 208. If the requested data file has been encrypted, the targeted decryption module 204 can retrieve the encrypted data corresponding to the requested data file from the storage 208.

The process 600 also includes requesting the key generator to generate a cryptographic key using values of one or more system attributes (stage 604). As discussed above in relation to FIGS. 2 and 3, the key generator 206 can generate the cryptographic key based on the values of one or more system attributes. The targeted decryption module 204 can request the key generator 206 to generate the cryptographic key for decrypting the encrypted data. The key generator 206 can generate the cryptographic key using the same system attributes and the same key generation policy that is used to generate the cryptographic key used to encrypt the data. The process 600 additionally includes decrypting the encrypted data using the cryptographic key received from the key generator to generate decrypted data (stage 606). The targeted decryption module 204 uses a decryption algorithm that corresponds to the encryption algorithm used by the targeted encryption module 202 to encrypt data. Using the decryption algorithm, and the cryptographic key provided by the key generator 206, the targeted decryption module 204 decrypts the encrypted data and can load the decrypted data in memory. The decrypted data can then be provided to the requesting entity, which can be a user at the terminal, or another application running on the computing system 200. Alternatively, the decrypted data can be stored in the storage 208.

In one or more implementations, the key generation process 400, the targeted encryption process 500 and the targeted decryption process 600 can be used to protect unauthorized access of documents outside of the computing system 200. For example, files such as documents can be encrypted using a cryptographic key that is generated using system attributes associated with the computing system 200, as discussed above. In the event of data being stolen from the storage 208 and being accessed outside of the computing system, the attacker would need to know the cryptographic algorithm used to encrypt the stolen data as well as the cryptographic key used to encrypt the data. Even if the cryptographic algorithm may be determined fairly easily, the cryptographic key would be challenging for the attacker to guess. This is because the attacker has no knowledge of the system attributes and the key generation policy used to combine the system attributes to generate the key, as the attacker is located remotely from the computing system 200. Therefore, once the data is removed from the computing system 200, the attacker would have to resort to a brute-force cryptanalysis to guess the cryptographic key.

However, the targeted encryption and decryption process can be seamlessly carried out for authorized access to data at the computing system 200. A user or an application can provide data to be stored at the computing system 200, which data can be encrypted by the targeted encryption module 202 and stored in the storage 208. The targeted encryption module 202 can use the cryptographic key provided by the key generator 206, which uses the values of one or more system attributes to generate the key. When the user or an application requests the data from the storage, the targeted decryption module 204 can decrypt the encrypted data using the same key used for encryption, and provide the decrypted data to the user or the application.

In one or more implementations, the computing system can maintain a system attributes list or database 214 (FIG. 2) to store the values and the key generation policy used to generate one or more cryptographic keys. In some instances, the values of the system attributes used to generate a key can change. For example, if a file name used as a system attribute to generate a cryptographic key is changed, the key generator 206 may not be able to re-generate the same cryptographic key that was used for encryption. Similarly, changes in the key generation policy made after a cryptographic key was used to encrypt data may result in the generation of a cryptographic key that is different from the one used for encryption. In either case, without the same cryptographic key as the one used for encryption, the encrypted data may become impossible to decrypt. To account for changes in the values of the system attributes, the computing system 200 can maintain a system attributes list or database 214, which can include a list of all the files that have been encrypted and the corresponding identities and values of the system attributes used to generate the cryptographic key used to encrypt the files. The system attributes list or database 214 can also include the key generation policy used to generate the key. The list or database 214 may be populated by the targeted encryption module 202 or the key generator 206 with the file name and the corresponding system attribute and key policy information each time a file is encrypted. When a file is decrypted by the targeted decryption module 204, the targeted decryption module 204 or the key generator 206 can access the list or database 214 to access the system attributes and key generation policy information corresponding to that file to generate the cryptographic key. In this manner, the computing system 202 can ensure that the cryptographic key generated for decryption matches the cryptographic key used for encryption.

In one or more implementations, the seamless targeted encryption and decryption process can be executed when documents are saved to or accessed from storage. For example, the targeted encryption and decryption processes can be executed using macros, which can execute the encryption of the document using the targeted encryption module 202 when the document is saved in the storage 208, and can execute the targeted decryption module 204 when the document is opened or accessed within the computing system 200.

In another example implementation, a binary for a Society for Worldwide Interbank Financial Telecommunication (SWIFT) transactions can be protected using the targeted encryption technique discussed above in relation to FIGS. 2-6. In an example attack on a SWIFT transaction, an attacker can modify a SWIFT binary and associated library files (such as, for example, dynamic-linked library (.dll) files), on which the SWIFT transaction is executed, in order to manipulate a system to do massive money transfers. The SWIFT binary can use targeted encryption based on system attributes such as intranet files or system files as discussed above. When an attacker steals the binaries in order to reverse engineer and modify them, the attacker will be unable to access information on the binary, as the binary would be encrypted and the attacker will not have the knowledge of the system attributes and the key generation policy used to generate the cryptographic key. The attackers would not only have to determine how the key was derived, but they would also have to get back on the computing system 200 to access the cryptographic key.

In yet another example implementation, security-monitoring applications can be protected using targeted encryption. In some instances, attackers have been able to modify binaries of security monitoring applications to ignore certain files or certain file changes. The attackers have been able to do this, because they can easily reverse engineer the security software binaries and modify them. Targeted encryption, as discussed above, can be used to secure the monitoring applications from tampering.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

The invention claimed is:

1. A method for securing data in a computing system, comprising:
   receiving, at the computing system, data for storage to a data storage device;
   acquiring values of one or more system attributes from a plurality of system attributes associated with the computing system based on a key generation policy;
   transforming the values of the one or more system attributes using a transformation function based on the key generation policy to generate a cryptographic key;
   encrypting the received data using the generated cryptographic key to generate an encrypted data file;
   adding a decryption algorithm to the encrypted data file; and
   providing the encrypted data file to a requesting device, wherein the requesting device generates the received data from the encrypted data file using the decryption algorithm contained in the encrypted file, and the generated cryptographic key.

2. The method of claim 1, wherein acquiring the values of the one or more system attributes from the plurality of system attributes associated with the computing system based on the key generation policy includes acquiring values of at least one of a file system attribute and a hardware attribute associated with the computing system.

3. The method of claim 2, wherein the file system attribute includes data including at least one of a file name, a directory name, a partition name, data within a file, and metadata.

4. The method of claim 2, wherein the hardware attribute includes at least one of a media access control (MAC) address, a universally unique identifier (UUID), and an international mobile equipment identity (IMEI).

5. The method of claim 1, wherein the key generation policy defines a number and type of system attributes to be acquired to be used for generating the cryptographic key.

6. The method of claim 1, wherein the key generation policy defines a type of transformation function used for generating the cryptographic key.

7. The method of claim 1, further comprising, storing, in a list, the acquired values of the one or more system attributes, the key generation policy, and an identity of the corresponding received data that has been encrypted.

8. The method of claim 7, further comprising:
   receiving a request to decrypt the generated encrypted data;
   accessing the list to determine the acquired values of the one or more system attributes and the key generation policy corresponding to the identity of the received data that has been encrypted;
   re-generating the cryptographic key using the determined values of the one or more system attributes and the key generation policy; and
   using the generated cryptographic key to decrypt the encrypted data.

9. A computing system, comprising:
   a computer processor having programmed instructions to acquire values of one or more system attributes from a plurality of system attributes associated with the computing system based on a key generation policy, and transforms the values of the one or more system attributes using a transformation function based on the key generation policy to generate a cryptographic key;
   an input/output port that receives a request for encrypting data for storage in a data storage device,
   wherein the computer processor encrypts the received data to generate an encrypted data file using the cryptographic key and adds a decryption algorithm to the encrypted data file, and the computer processor provides the encrypted data file to a requesting device, wherein the requesting device generates the received data from the encrypted data file using the decryption algorithm contained in the encrypted file, and the generated cryptographic key.

10. The computing system of claim 9, wherein the values of the one or more system attributes includes values of at least one of a file system attribute and a hardware attribute associated with the computing system.

11. The computing system of claim 10, wherein the file system attribute includes data including a file name, a directory name, a partition name, data within a file, and metadata.

12. The computing system of claim 10, wherein the hardware attribute includes at least one of a media access control (MAC) address, a universally unique identifier (UUID), and an international mobile equipment identity (IMEI).

13. The computing system of claim 9, wherein the key generation policy defines a number and type of system attributes to be acquired to be used for generating the cryptographic key.

14. The computing system of claim 9, wherein the key generation policy defines a type of transformation function used for generating the cryptographic key.

15. The computing system of claim 9, further comprising a memory that stores, in a list, the acquired values of the one or more system attributes, the key generation policy, and an identity of the corresponding received data.

16. The computing system of claim 15, wherein the computer processor:
   accesses the list in memory to determine the acquired values of the one or more system attributes and the key generation policy corresponding to the identity of the received data that has been encrypted, and re-generates the cryptographic key using the determined values of the one or more system attributes and the key generation policy.

17. The method of claim 1, wherein acquiring the values of the one or more system attributes from the plurality of system attributes associated with the computing system based on the key generation policy includes acquiring values of a hardware attribute, and wherein the hardware attribute includes at least one of a universally unique identifier (UUID) and an international mobile equipment identity (IMEI).

18. The method of claim 1, wherein acquiring the values of the one or more system attributes from the plurality of system attributes associated with the computing system based on the key generation policy includes acquiring values of a file attribute, and wherein the file attribute includes at least one of a file name and a directory name.

19. The computing system of claim 9, wherein the values of the one or more system attributes includes values of a hardware attribute, and wherein the hardware attribute includes at least one of a universally unique identifier (UUID) and an international mobile equipment identity (IMEI).

20. The computing system of claim 9, wherein the values of the one or more system attributes includes values of a hardware attribute a file attribute, and wherein the file attribute includes at least one of a file name and a directory name.

* * * * *